June 6, 1944. J. TJAARDA 2,350,377
AIRCRAFT ENGINE GEARING
Filed July 3, 1940 4 Sheets-Sheet 1
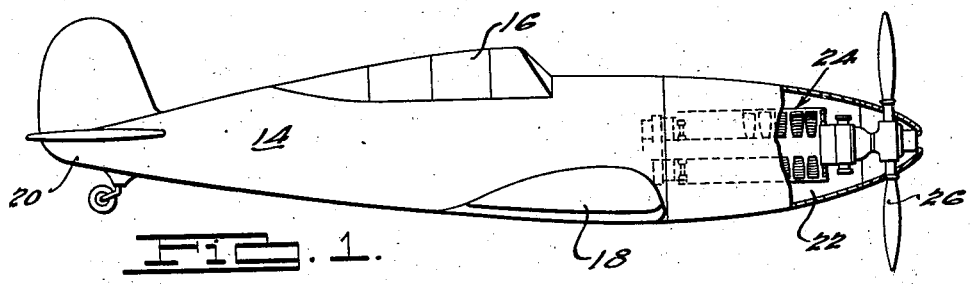
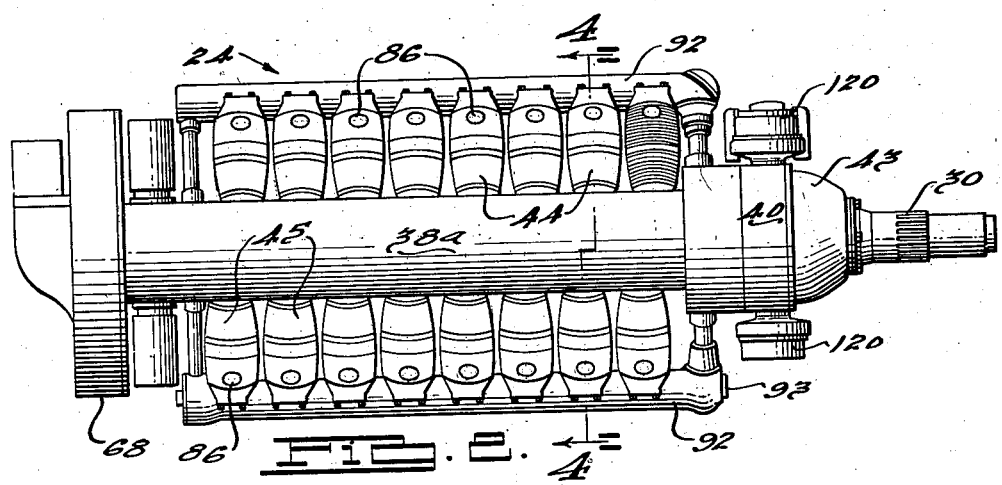
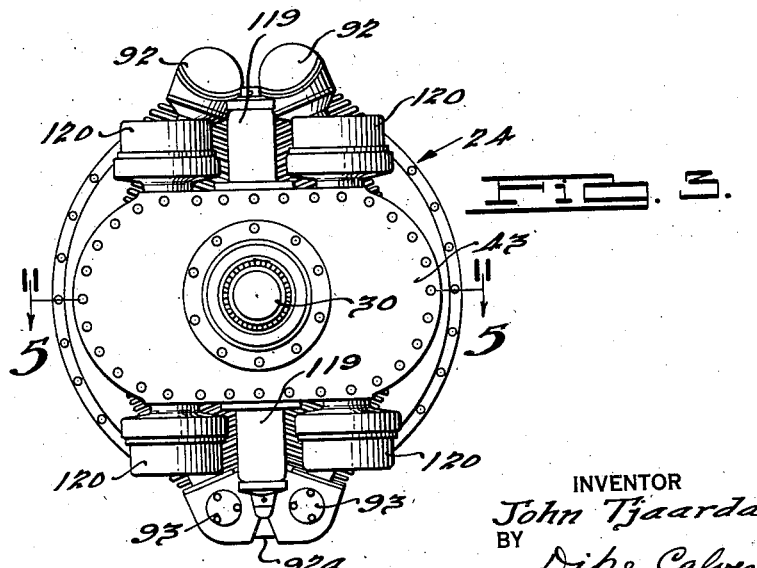
INVENTOR
John Tjaarda.
BY
Dike Calver & Gray
ATTORNEYS.

June 6, 1944.  J. TJAARDA  2,350,377
AIRCRAFT ENGINE GEARING
Filed July 3, 1940  4 Sheets-Sheet 2

INVENTOR
John Tjaarda.
BY
Dike, Calver & Gray
ATTORNEYS

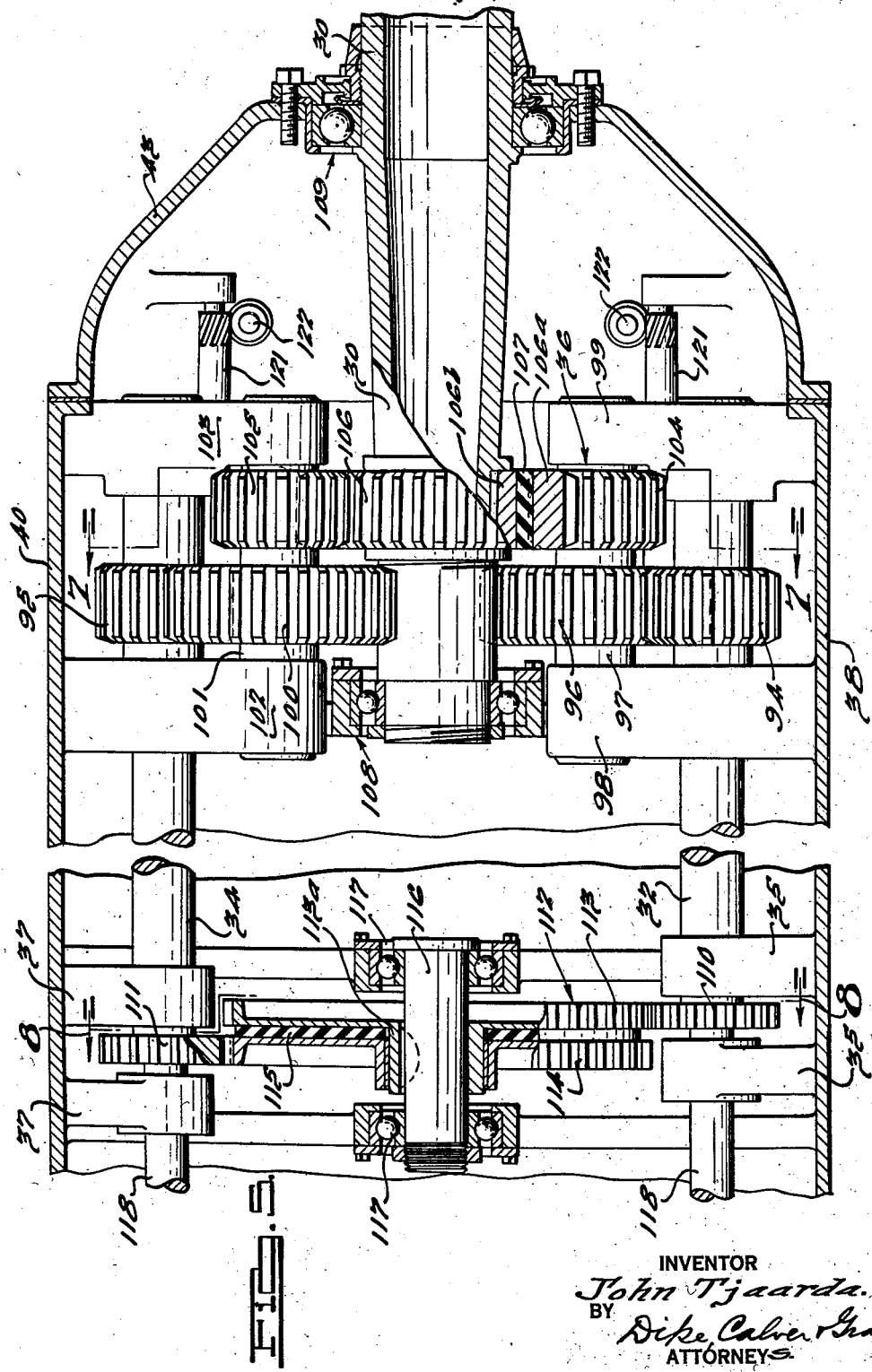

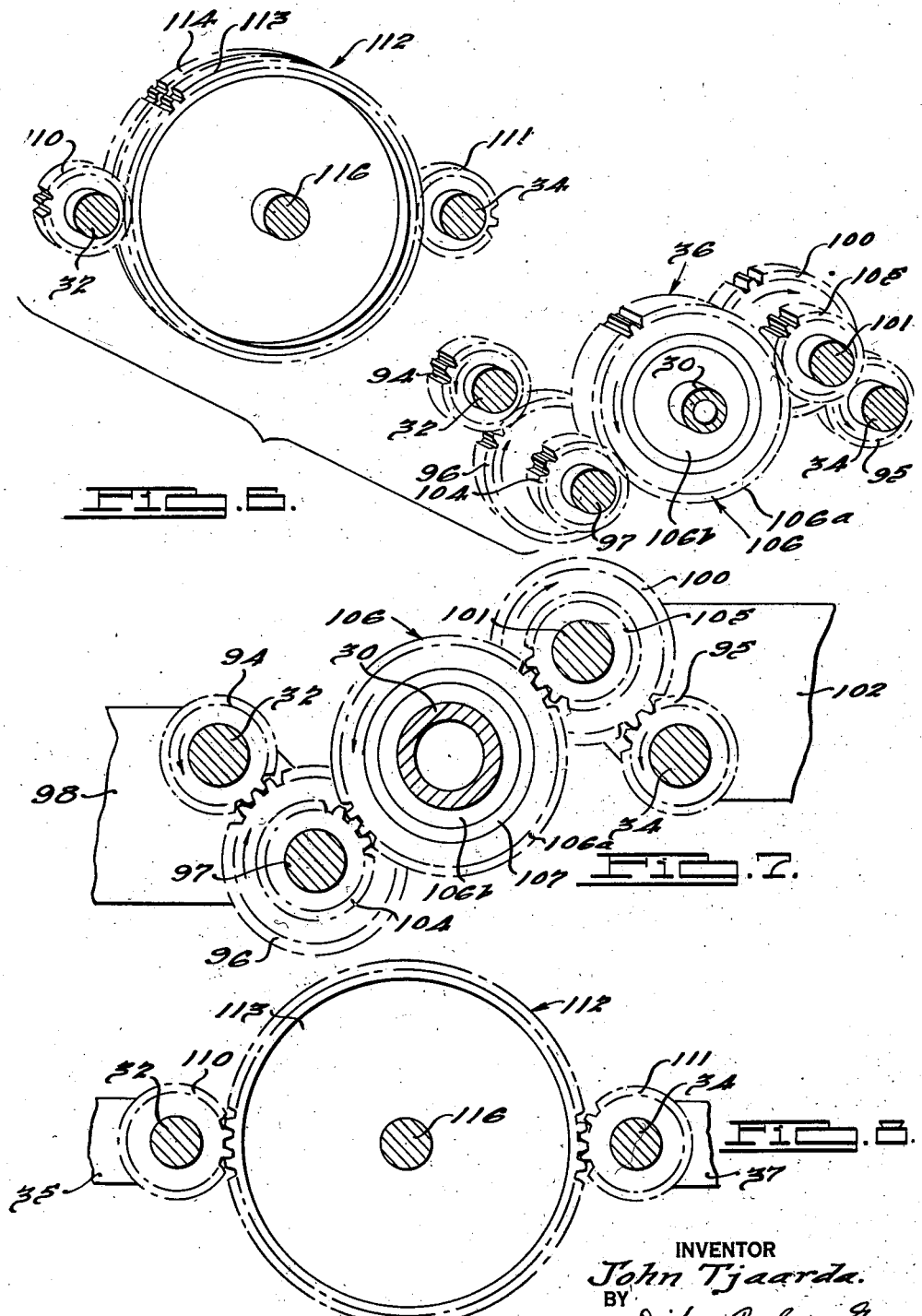

Patented June 6, 1944

2,350,377

UNITED STATES PATENT OFFICE 2,350,377

AIRCRAFT ENGINE GEARING

John Tjaarda, Detroit, Mich., assignor to Briggs Manufacturing Company, Detroit, Mich., a corporation of Michigan Application July 3, 1940, Serial No. 343,641

9 Claims. (Cl. 74—410)

This invention relates to aircraft and more particularly to the power plant thereof and the drive mechanism for rotating the propeller shaft of the aircraft from the crankshafts. In accordance with one phase of the invention the power plant or engine is of the internal combustion type embodying a number of banks of cylinders having reciprocable pistons for driving a plurality, such as two, parallel crankshafts which in turn drive a propeller shaft.

An object of the invention resides in the provision of an improved drive mechanism interposed between parallel spaced crankshafts to drive a centrally disposed propeller shaft.

Another object of the invention is to provide an aircraft engine having two parallel crankshafts operated from banks of cylinder units and a centrally disposed propeller shaft wherein improved gear mechanism is provided for driving the propeller shaft from the crankshafts.

A further object of the invention is to provide an aircraft engine of the foregoing character in which a shock absorbing drive is interposed between the crankshafts and the propeller shaft.

Another object of the invention is to provide an aircraft engine having spaced parallel crankshafts and a reduction gear drive between the crankshafts and the propeller shaft having incorporated therein flexible or resilient coupling means effective during operation of the engine to absorb shocks and damp out torsional vibrations.

Still a further object of the invention is to provide a gear drive between a plurality of crankshafts and a propeller shaft in which torsional vibrations are neutralized or materially reduced.

Another object of the invention is to provide a reduction gear drive between corresponding ends of a pair of crankshafts and the propeller shafts and gear interconnections between opposite corresponding ends of the crankshafts thereby improving the distribution of forces on the crankshafts, materially reducing torsional vibrations, and effecting a better balance of the crankshafts.

A further object of the invention is to provide an aircraft engine of the dual crankshaft type in which the rear ends of the crankshafts have a non-positive driving connection between each other.

Also it is an object of the invention to provide a dual crankshaft aircraft engine having a positive driving connection between the forward ends of the crankshafts and a non-positive driving connection between the crankshafts and the propeller shaft.

More specifically it is an object of the invention to provide a dual crankshaft aircraft engine in which the reduction gear drive between the forward ends of the crankshafts and the propeller shaft embodies a resilient coupling, and in which a gear connection is provided between the rear ends of the crankshafts which also embodies a resilient coupling.

In the operation of aircraft, it is desirable that all of the elements of the craft be proportioned and streamlined in such a manner as to pass through the air with the minimum resistance, and if possible to cooperate with other elements of the craft to produce lift. As the necessity for larger and faster aircraft increases, the problem of developing more powerful engines with decreased resistance or drag presents increasing difficulties.

An object of this invention is to provide a more powerful engine having less frontal area capable of producing resistance or drag than has heretofore been possible.

A further object of the invention resides in the provision of spaced engine units having angularly inclined power units disposed in novel nesting relation adjacent each other to provide a powerful engine having the minimum frontal area.

A still further object of the invention is to position a pair of engine units each having cylinder units disposed at an angle of approximately 135°, in such an improved manner that the outer ends of the cylinders of each engine unit lie adjacent each other, thereby minimizing the front area of the engine.

Another object is to provide an engine having angularly inclined generally oppositely disposed groups of cylinder units having their outer ends positioned adjacent each other, wherein a combustible mixture is supplied to all of the cylinders at oppositely disposed points adjacent their outer ends, and the products of combustion are discharged outwardly from the cylinders at points approximately opposite the inlet points.

Other objects and advantages of this invention will appear in the following description and appended claims, reference being had to the accompanying drawings forming a part of this specification wherein like reference characters designate corresponding parts in the several views.

Fig. 1 is a side elevation, partly broken away, of an airplane embodying the present invention.

Fig. 2 is a side elevation of the engine mounted within the airplane disclosed in Fig. 1.

Fig. 3 is a front end elevation of the engine illustrated in Fig. 2.

Fig. 5 is an enlarged fragmentary section taken substantially through lines 5—5 of Fig. 3 looking in the direction of the arrows.

Fig. 6 is a diagrammatic view illustrating in perspective the gear drive between the crankshafts and the propeller shaft.

Fig. 7 is a section, partly diagrammatic, taken substantially through lines 7—7 of Fig. 5 looking in the direction of the arrows.

Fig. 8 is a section, partly diagrammatic, taken substantially through lines 8—8 of Fig. 5 looking in the direction of the arrows.

Figure 4:
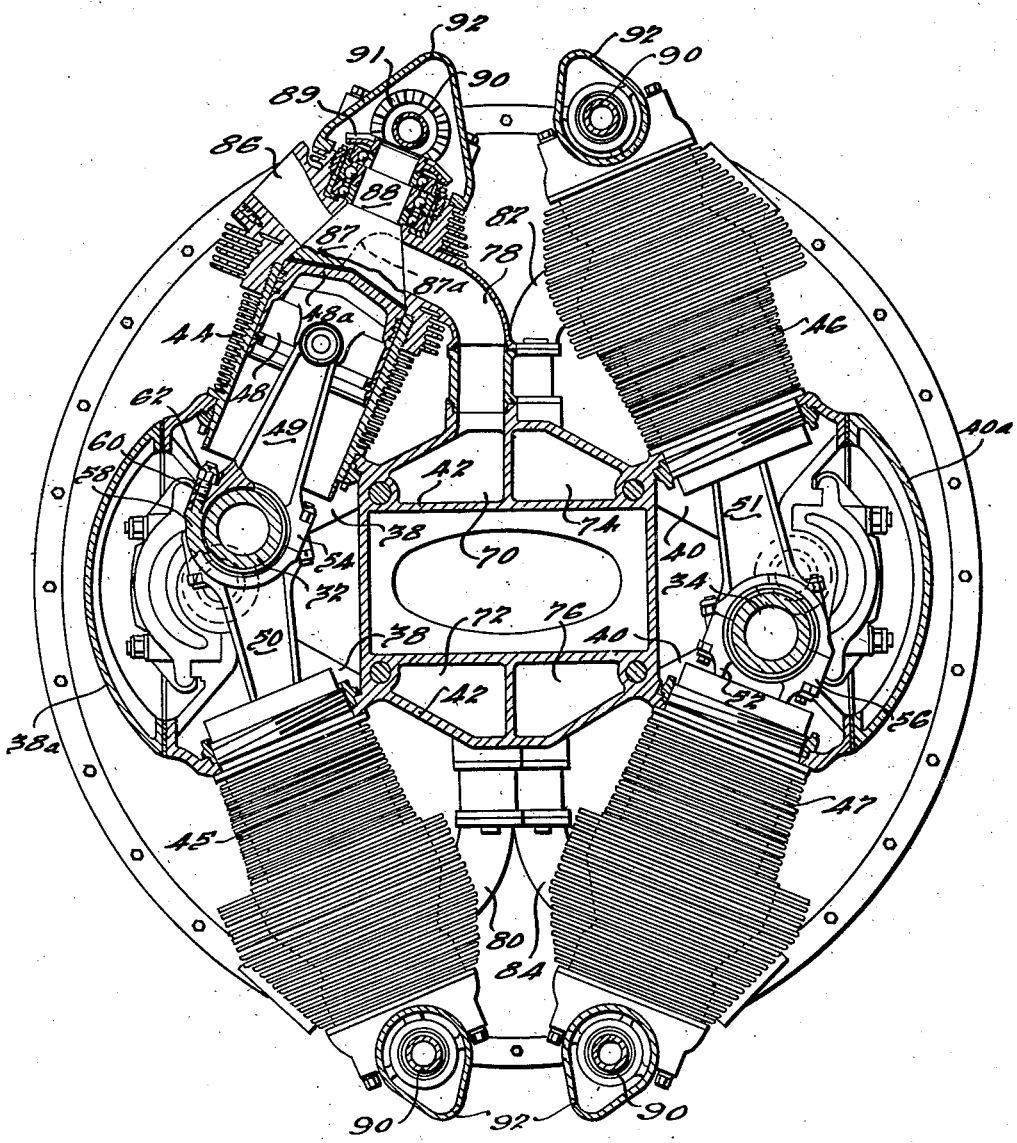
Fig. 4 is an enlarged section taken substantially through lines 4—4 of Fig. 2 looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

For the purpose of illustrating the present invention there is shown, by way of example, in the drawings a multi-cylinder internal combustion engine together with the drive mechanism between the crankshafts of the power plant and the propeller shaft installed within a suitable airplane illlustrated in Fig. 1. This airplane comprises a fuselage 14 including a passenger compartment 16, generally laterally extending wings 18 and an empennage 20 to assist in controlling the direction of flight of the craft. A streamlined engine compartment 22 houses the power plant 24 which in turn is adapted to drive a propeller 26 to propel the craft through the air.

In the present instance the power plant of the airplane comprises an engine of the double V-type, as clearly illustrated in Figs. 2 to 4 inclusive. This engine is provided with oppositely inclined banks of cylinders disposed in such a manner that the outer ends of generally upwardly and downwardly extending cylinders of spaced cylinder groups or banks are positioned to lie adjacent each other. It will be observed that the engine thus formed is generally oval in shape. Thus, in the present embodiment of the invention there are illustrated four banks or groups of engine units or cylinders arranged angularly with respect to one another, each bank or group comprising a suitable number of cylinders such as eight in the present instance. The illustrated engine, therefore, comprises thirty-two cylinders although it will be understood that a different number may be utilized. It will thus be seen from the construction of the power plant that the engine as a whole is particularly adapted for use in a wing structure wherein it may be laid on its side, or it may be mounted upright as a central power plant as illustrated in Fig. 1. When mounted in either position it may be readily surrounded by a streamlined shell whereby frictional resistance to the air is minimized.

Referring particularly to Figs. 2 and 5, it will be seen that a centrally disposed propeller shaft 30 adapted to receive the propeller 26 is driven by spaced parallel right and left crankshafts 32 and 34, respectively, through improved reduction gear mechanism designated as a whole at 36. The crankshafts 32 and 34 are rotatably journaled at their rear ends through the medium of suitable bearings 36 and 37 in crankcase housings 38 and 40, respectively, these housings being separated by a central truss-like housing 42. The crankcase housings 38 and 40 are accessible at their outer sides by means of convex cover plates 38a and 40a. As illustrated in Fig. 5, the front ends or portions of the housings 38, 40 and 42 may be closed by means of a concavo-convex streamlined end plate 43 rigidly secured in position. The crankcase housing 38 receives the inner ends of the generally upwardly and downwardly extending cylinder units 44 and 45 of two vertically spaced banks of cylinders and in like manner the crankcase housing 40 receives the inner ends of similarly arranged cylinder units 46 and 47 of the other two vertically spaced banks of cylinders. The cylinders are preferably so arranged that the included angle between the upwardly and downwardly extending cylinders on each side, i. e. cylinders 44 and 45 on one side and cylinders 46 and 47 on the opposite side, is approximately 135°, thereby giving equal firing intervals during the operation of the engine and providing a very compact construction occupying a minimum of space.

Referring to Fig. 4, it will be noted that the cylinders 44 and 45 are provided with pistons 48 operably connected to the crankshaft 32 through the medium of connecting rods 49 and 50, respectively. In like manner the cylinders 46 and 47 are provided with pistons operably connected to the crank shaft 34 by means of similar connecting rods 51 and 52 respectively. The adjacently arranged connecting rods 49 and 50 and in like manner the adjacently arranged connecting rods 51 and 52 are provided, respectively, with bearings 54 and 56 adapted to surround offset cranks of the crankshafts 32 and 34, and are securely fixed thereto by means of caps 58 having threaded extensions 60 adapted to project through spaced apertures in the flared larger ends of the connecting rods to receive nuts 62 to maintain the parts in assembled relation. By positioning the parts in the manner illustrated more desirable distribution of weight is effected because of a reduction in the radius of gyration of rod and crank assembly. Better balance resulting in less vibration and more uniform operation of the engine are, therefore, achieved.

As illustrated in Fig. 2, the upper and lower cylinder units 44 and 45, or 46 and 47, of each of the vertically spaced units are offset slightly longitudinally relative to each other whereby the connecting rods 49 and 50, or 51 and 52, connecting the opposed upper and lower pistons of the cylinder units may be mounted side by side on single crank arms of the crankshafts. A more rugged and economical crankshaft design is, therefore, possible and greater simplicity of bearing construction for the two crankshafts is achieved.

Each cylinder may be supplied with a combustible mixture through the use of suitable fuel injectors (not shown) of any known type. Air may be supplied to the cylinders through the medium of manifold passageways 70, 72, 74 and 76 formed in the central housing 42, see Fig. 4, these passageways communicating by means of risers 78, 80, 82 and 84, respectively, with the upper and lower banks of cylinders at the left and right-hand sides of the power plant as viewed in Fig. 4. Suitable superchargers in housings 68 are employed, these being driven by one or both of the crankshafts 32, 34 through the medium of suitable gearing interposed therebetween, or through a cross shaft driving the supercharger on each side of the engine. It will be noted that the supply of combustible mixture is from the inner side of each cylinder outwardly towards the cylinder, and the exhaust gases are permitted to escape through the exhaust ports 86 (Figs. 2 and 4) located at the outer sides of the cylinders. Suitable exhaust conduits designed to minimize back pressure may be employed to direct the gases outside of the confines of the streamlined housing surrounding the engine, thereby minimizing the heating of the engine by the exhaust gases.

In the present instance the intake of the combustible mixture into each cylinder, also the scavenging and exhaust of the products of combustion, are controlled by valve mechanism positioned in the outer extremities of the cylinders. The intake passage for each cylinder and the exhaust passage 86 communicate with inlet and outlet ports in a rotary cone-type valve 87 mounted in the cylinder head. Each valve as seen in Fig. 4 has an outwardly projecting stub shaft 88 journaled through the medium of suitable bearings in the cylinder head. Each shaft 88 carries a bevel gear 89 in mesh with a gear 91 secured to a valve driving shaft 90. Each valve actuating shaft 90, together with gearing 89 and 91, operates in a longitudinally extending housing 92. The valve mechanism may be constructed in accordance with my application Serial No. 192,602. The shafts 90 are preferably hollow to minimize weight and to permit the flow of oil therethrough for lubricating purposes. The inner face of the rotary valve 87 is concave to cooperate with the complementary convex head 48a of the piston, the valve having an interior dome-like combustion chamber 87a with which the intake and exhaust passages 78 and 86 communicate at intervals during rotation of the valve. The spark plug for each cylinder also communicates with the combustion chamber or cavity at predetermined intervals during the rotation of the valve for the purpose of firing the compressed mixture.

The valve actuating shafts 90 for the upper and lower banks of cylinders at each side of the power plant are driven from the crankshafts 32 and 34 by suitable mechanism such as illustrated in my application Serial No. 296,836. Such mechanism may also in part be utilized to operate the distributor mechanism, as in said application. The valve actuating shaft housings 92 at the lower extremity of the engine at the rear thereof are preferably interconnected at 92a, as shown in Fig. 3, to permit lubricating oil to flow from one of the housings 92 to the other during operation of the engine. An oil pump or pumps may be positioned in either or both housings at 93 to circulate oil to the vital parts of the engine needing lubrication. These pumps may be driven from the adjacent valve actuating shafts. The oil pump mechanism may be constructed in accordance with my above mentioned application Serial No. 296,836.

In the event that the front end of the engine is lower than the rear end, as when the craft is diving, oil will be transmitted through the hollow valve actuating shafts 90 from the opposite end of the engine by the suction created by the oil pumps. If it is desired to fly the craft in inverted position for sustained periods of time, the upper housings 92 may be interconnected and one or more oil pumps positioned to be driven by the valve actuating shaft in the manner above referred to in connection with the pumps located at points 93 in Fig. 3.

Referring particularly to Figs. 5 to 8 inclusive, within the crankcase housings 38 and 40 for the four banks of cylinders or engine units is located the mechanism for driving the propeller shaft 30 from the spaced parallel crankshafts 32 and 34, it being noted that the propeller shaft extends parallel to the crankshafts and is mounted centrally therebetween. In Fig. 5 the opposite front and rear ends of the crankcase housings are shown only, that portion of each crankshaft intermediate its ends having crank throws to which the connecting rods are attached, being omitted in order to show at the left the interconnection between the rear ends of the crankshafts and at the right the reduction drive gearing between the forward ends of the crankshafts and the propeller shaft 30.

Rigidly secured to the forward ends of the crankshafts 32 and 34 are gears 94 and 95 respectively. The gear 94 meshes with a larger gear 96 fixed to a short shaft 97 journaled in bearing bosses 98 and 99 extending from the crankcase housing 38. These bosses also provide bearings for the front end of the crankshaft 32. In like manner, the gear 95 meshes with a gear 100, similar to gear 96, fixed to a short shaft 101, similar to shaft 97, journaled in bearing bosses 102 and 103 extended from the opposite crankcase housing 40. These bosses also provide bearings for the front end of the crankshaft 34. Secured to the shaft 97 forwardly of the gear 96 is a relatively small gear 104 and correspondingly secured to the shaft 101 is a gear 105 similar to the gear 104. The reduction gears 104 and 105 mesh with a single plane compound gear 106 fixed to the hollow propeller shaft 30. The gear 106, in the present instance, is constructed to provide a flexible coupling between the crankshafts and the propeller shaft. For the purposes of exemplification of this feature of the invention the gear 106 comprises an outer gear ring 106a and an inner hub member 106b fastened on the propeller shaft. Interposed between the annular hub 106b and the outer gear ring 106a is a resilient coupling ring which in the present instance is formed of elastic rubber material which may be bonded to the adjacent faces of the hub member 106b and the gear ring 106a so that torsional vibrations may be absorbed through the inner internal friction of the rubber. The foregoing construction of the driven gear 106 of the reduction gear mechanism, providing a resilient coupling between the crankshafts and the propeller shaft thereby interrupting the metallic path, is a present preferred construction, it being understood that in its broader aspects the invention is not limited to the particular resilient coupling herein illustrated by way of example.

The propeller shaft 30 is journaled at its rear end at 108 through bearings carried by the bosses 98 and 102. Adjacent its outer end, somewhat rearwardly of the point of attachment of the propeller 26 to the propeller shaft, the latter is journaled in suitable bearings 109 in the forward end of the concavo-convex end plate 37 attached to the crankcase housings. It should be understood that, although there is a resilient coupling between the crankshafts and the propeller shaft, there is a solid or direct positive drive between the two crankshafts through the medium of gear ring 106a meshing with gears 104 and 105.

In accordance with the foregoing I have described the present preferred reduction gear drive between the spaced parallel crankshafts 32, 34 and the centrally located propeller shaft 30. I will now describe the present preferred manner in which the crankshafts are interconnected at the rear end of the power plant, reference in this respect being had to Figs. 5 to 8 inclusive, The connection between the rear ends of the crankshafts is in the form of gearing having incorporated therein a flexible coupling interposed between the crankshafts. Rigidly secured to the crankshaft 32 adjacent its rear end and intermediate the bearing bosses 35 is a gear 110. In like manner, a similar gear 111 is fixed to the crankshaft 34 at its rear end intermediate the bearing bosses 37. It will be noted that the gears 110 and 111 are not coplanar, the gear 111 being offset somewhat rearwardly of the gear 110. These gears mesh with separate exterior teeth formed on a dual plane compound gear 112. This compound gear comprises a main gear member 113 having teeth meshing with the teeth of gear 110, and also comprises a second gear member 114 spaced rearwardly of the gear member 113 and having external teeth meshing with the gear 111. Gear member 114 may be freely mounted through the medium of a resilient rubber bushing on an extended hub portion 113a of the gear 113. Interposed between the faces of gear members 113 and 114 is a resilient rubber disk 115 which is either bonded to the opposed faces of the gear members or clamped tightly so that relative torsional vibrations of the crankshafts are absorbed principally through internal friction of the rubber, there preferably being little or no skin friction at the opposite faces of the rubber disk. It will be seen from the foregoing that the resilient rubber couplings 107 and 115 interrupt the metallic path between the crankshafts and also between the latter and the propeller shaft. A driving circuit is thus completed between the banks of connecting rods of the cylinders and the two crankshafts through opposite ends of these shafts, the propeller shaft being connected in this circuit and being relatively free of torsional vibrations to which the crankshafts may be subjected.

By interconnecting the crankshafts in the above described manner it may be said that the front one-half of each crankshaft is coupled at gear 106a direct or positively to the other, whereas the remaining rear halves of the crankshafts are flexibly or resiliently connected together. This construction will overcome the torsional vibrations of the crankshafts to such an extent as to reduce by substantially or nearly one-half the torsional vibrations, an important factor owing to the length of the crankshafts.

The gear member 113 of the compound gear 112 is keyed through the medium of its hub 113a to a short shaft 116 journaled in suitable bearings 117 in bosses projecting from the crankcase housings. The crankshafts 32 and 34 are provided with rearward shaft extensions 118 which may be utilized for the purposes of accessory drives, such as to drive machine gear synchronizing mechanisms and other necessary elements. A pair of oppositely disposed generators 119 interposed between pairs of distributors 120 at the forward end of the power plant may be driven through the medium of drive shafts 121 actuated from the crankshafts. The shafts 121, as shown in Fig. 5, have worm drive connections with shafts 122 operatively connected to the distributors.

The power plant may be positioned within the streamlined shell 22 in such a manner that air is directed between the cylinders and flows outwardly between the cylinders and over the heat radiating and rigidifying fins on the cylinders to cool the engine. If desired the cylinders may be jacketed and cooled with liquid.

Referring to Figs. 6 and 7, it will be noted that idler gears 96 and 100 are located at opposite sides of an imaginary line passing through the centers of the crankshafts 32 and 34 and the propeller shaft 30. In these figures the assumed direction of rotation of the propeller shaft and crankshafts and the associated gearing is indicated by the arrows. Thus, it will be seen that gear 96 is located at the one side (below in Fig. 7) of this crankshaft centerline which lies furthest therefrom in the direction of rotation of the propeller and crankshafts. In like manner, the gear 100 is located at the opposite side (above in Fig. 7) of this centerline and furthest therefrom in the direction of rotation of the propeller and crankshafts. By thus locating the gear unit 96, 104 and the gear unit 100, 105 in the manner shown at opposite sides of the centerline of the crankshafts with respect to the directions of rotation thereof and of the propeller shaft, the loads on the bearings for these gears are materially reduced. By virtue of this construction, therefore, it is possible not only to reduce the size of the bearings but also the idler gears, resulting in a much more compact, efficient and durable transmission.

An important feature of the present invention resides in the manner in which the transmission gearing is assembled and the resilient couplings pre-loaded. After assembling the crankshafts and propeller shaft with the gearing associated therewith in meshing relation at the forward and rear ends of the crankshafts, either one of the crankshafts is turned in its bearings relatively to the other crankshaft a predetermined amount, such as one or more degrees, thereby placing a torsional load on the resilient couplings and taking up the slack between the meshing gears. As a result of this relation between the gearing of the respective crankshafts, and as a result of the preloading of the resilient couplings 107 and 115, a much more efficient and quieter operating engine is obtained and improved damping of torsional vibrations is achieved. Thus, if it is considered that the engine consists of two flat sixteen cylinder engines set one against the other, it will be clear that the power output at the propeller shaft is equal to that of a thirty-two cylinder engine. In this connection the banks of cylinder units 44 and 45 together with associated parts may be considered as one V-type sixteen cylinder engine and the opposite banks of cylinder units 46 and 47 may be considered the other V-type sixteen cylinder engine, these engines being arranged in opposed relation and operable to drive a single centrally disposed propeller shaft. In order to hold these engines in step in relation to each other, they normally would be timed as a thirty-two cylinder engine. Back lash in the gears is overcome by the above described manner in which the two engines are connected together, i.e., overlapping one engine to the other to the extent of about one to two degrees thereby loading the gears at all times and providing a smoother operating engine, particularly at high speeds. The present engine is designed to operate at an R. P. M. of 5500 or more and, hence, important advantages in operation are achieved by preloading the gears between the crankshafts and preventing back lash.

I claim:

1. Gearing means to be used in connection with an internal combustion engine for driving a propeller shaft comprising a pair of substantially parallel crankshafts, a propeller shaft extending generally parallel to the crankshafts in a plane therebetween, a reduction gear drive between corresponding ends of said crankshafts and the propeller shaft, and a non-positive resilient driving connection independent of the propeller shaft between the opposite corresponding ends of the crankshafts.

2. Gearing means to be used in connection with an internal combustion engine for driving a propeller shaft comprising a pair of substantially parallel crankshafts, a propeller shaft extending generally parallel to the crankshafts in a plane therebetween, driving means between corresponding ends of the crankshafts and the propeller shaft, and a non-positive driving connection independent of the propeller shaft between the opposite ends of the crankshafts.

3. Gearing means to be used in connection with an aircraft internal combustion engine for driving a propeller shaft comprising a pair of substantially parallel crankshafts, a propeller shaft, gearing for driving said propeller shaft from the crankshafts, and non-metallic means for preloading the teeth of said gearing.

4. Gearing means to be used in connection with an aircraft internal combustion engine for driving a propeller shaft comprising a pair of substantially parallel crankshafts, a propeller shaft, gearing for driving said propeller shaft from the crankshafts, and torsionally stressed means for preloading the teeth of said gearing.

5. Gearing means to be used in connection with an aircraft internal combustion engine for driving a propeller shaft comprising a pair of substantially parallel crankshafts, a propeller shaft, gearing for driving said propeller shaft from the crankshafts, and a resilient coupling interposed in said gearing and torsionally stressed when the engine is at rest to load said gearing, said resilient coupling being adapted to interrupt the metallic path between said crankshafts and propeller shaft.

6. Gearing means for driving a propeller shaft comprising a pair of substantially parallel crankshafts, a propeller shaft extending generally parallel to the crankshafts in a plane therebetween, a reduction gear drive between corresponding ends of said crankshafts and the propeller shaft, and a non-metallic non-positive driving connection between the opposite corresponding ends of the crankshafts.

7. Gearing means for driving a propeller shaft comprising a pair of substantially parallel crankshafts, a propeller shaft extending generally parallel to the crankshafts in a plane therebetween, driving means between corresponding ends of the crankshafts and the propeller shaft, and a non-metallic non-positive driving connection between the opposite ends of the crankshafts.

8. Gearing means for use in connection with an internal combustion engine for driving a propeller shaft, comprising a pair of substantially parallel crankshafts, gear mechanism between the forward ends of the crankshafts and said propeller shaft, an idler shaft interposed between the crankshafts rearwardly of the propeller shaft and independent of the latter, a compound gear having one part secured to said idler shaft and another part yieldingly connected to said one part, and gear means connecting each crankshaft with one of said parts of the compound gear.

9. Gearing means for use in connection with an internal combustion engine for driving a propeller shaft, comprising a pair of substantially parallel crankshafts, gear mechanism between the forward ends of the crankshafts and said propeller shaft, an idler shaft interposed between the crankshafts rearwardly of the propeller shaft and independent of the latter, a compound gear having one part secured to said idler shaft and another part yieldingly connected to said one part, and gear means connecting each crankshaft with one of said parts of the compound gear, said yielding connection comprising a rubber coupling adapted to be torsionally stressed.

JOHN TJAARDA.